June 8, 1937.  R. P. ADAMS  2,083,183
FILTERING APPARATUS
Filed July 18, 1936  2 Sheets-Sheet 2
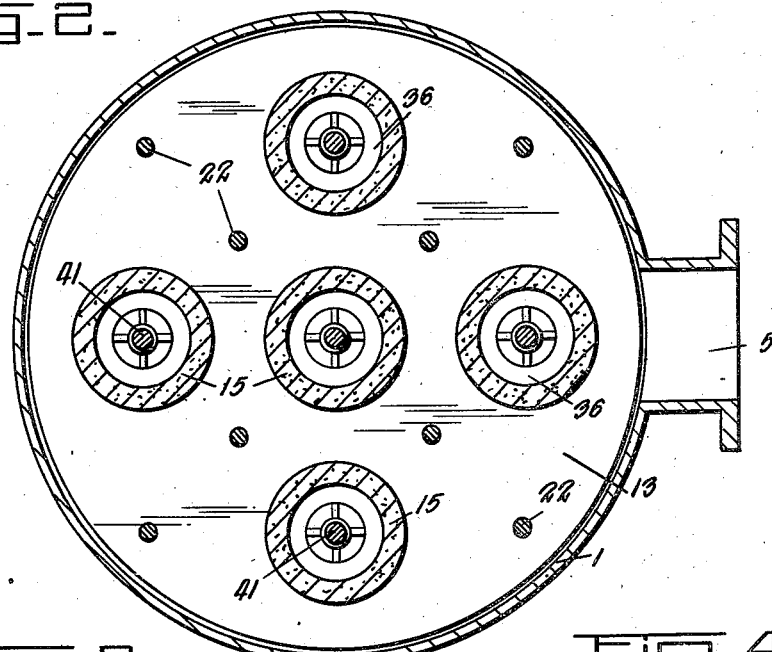
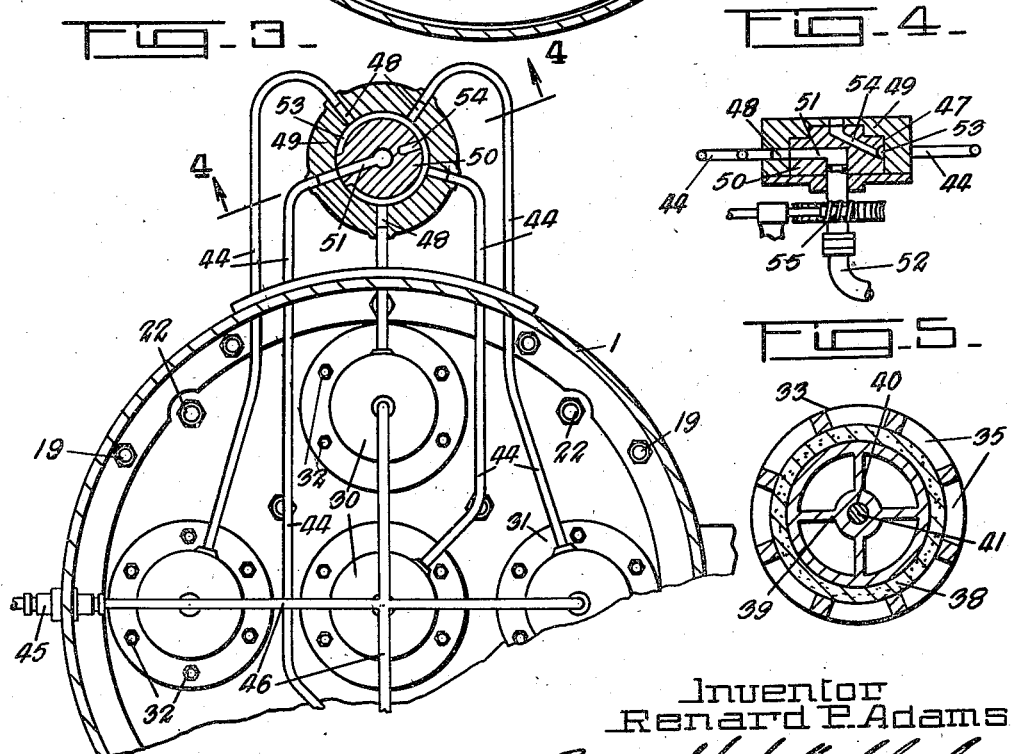
Inventor
Renard P. Adams
By Patented June 8, 1937

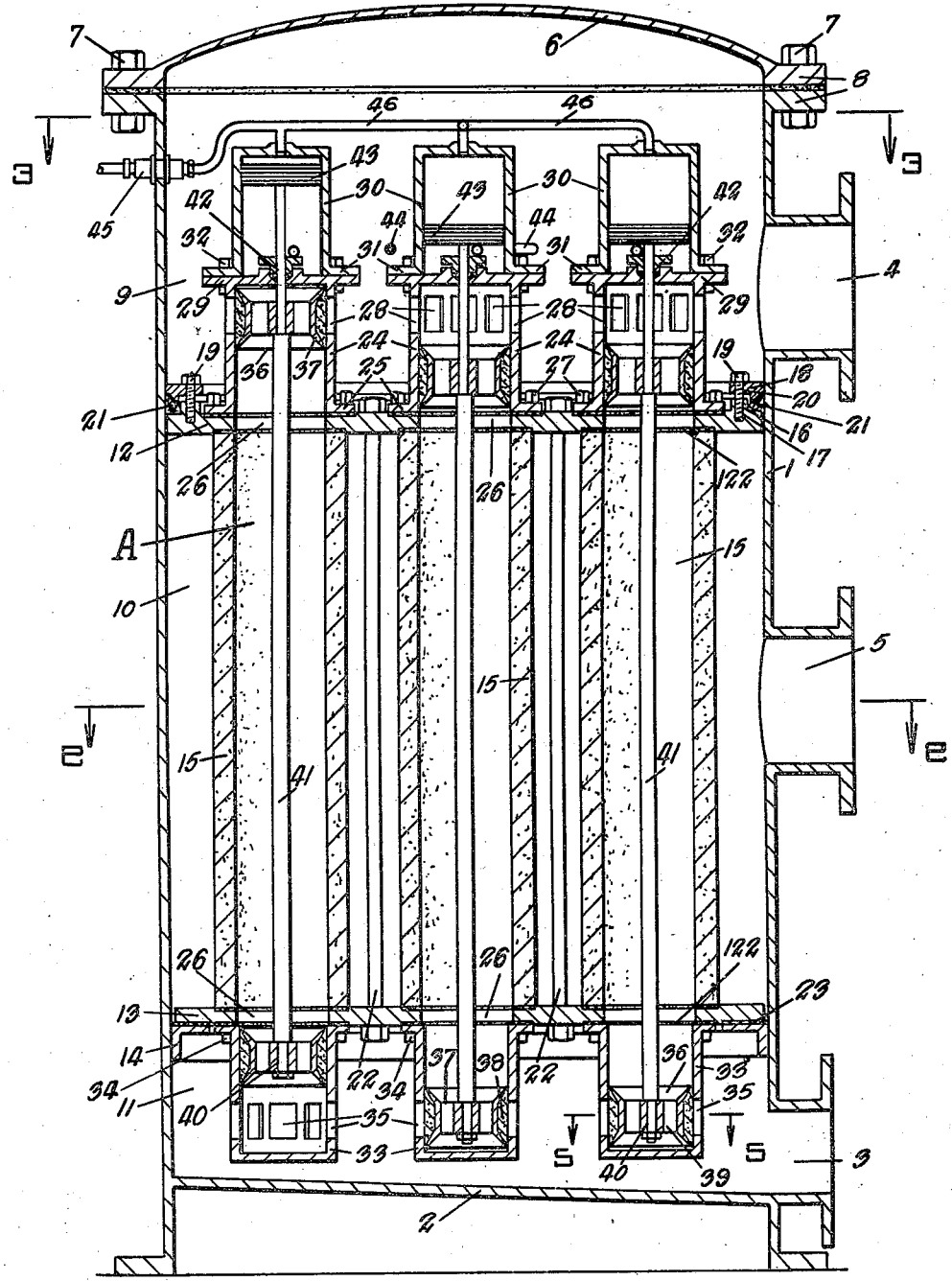

2,083,183

UNITED STATES PATENT OFFICE 2,083,183

FILTERING APPARATUS

Renard Paul Adams, Buffalo, N. Y.

Application July 18, 1936, Serial No. 91,293

17 Claims. (Cl. 210—120)

My invention relates to improvements in filtering apparatus and is more particularly designed for filtering water, although it is, of course, applicable to the filtering of other liquids, and the object of my invention is to provide a filter wherein the water has a continuous flow therethrough, and wherein sections of the filter can be back-washed and cleaned without interfering with the normal water flow.

Another and particular object of my invention is to provide a filtering apparatus incorporating a plurality of filter tubes contained within a chamber and wherein the water is fed into the tubes and passes through the walls thereof into the chamber, the passage of water through the tubes being controlled by a valve mechanism provided in each tube assembly.

A further object of my invention is to provide each tube with two valves, one valve controlling the passage of water into the tube and thence through the wall of the tube into the chamber, and the other valve provided for controlling communication between the bore of the tube and a back-wash drain which is furnished to receive back-wash water when the tube is being cleaned, said valves having a synchronous movement wherein one opens as the other closes.

Another object of my invention is to construct my apparatus so that it comprises a casing having a pair of partitions dividing the casing into three chambers, the filtering tubes being contained within the central chamber, and the water feed and back-wash valve mechanisms contained in the upper and lower chambers respectively.

With these and other objects in view, my invention consists of filtering apparatus constructed and arranged, all as hereinafter more particularly described and illustrated in the accompanying drawings, in which:

Fig. 1 is a vertical cross-sectional view through my filtering apparatus.

Fig. 2 is a horizontal cross-sectional view through the apparatus, being taken through the line 2—2, Figure 1.

Fig. 3 is a horizontal cross-sectional view through a fragmentary portion of the apparatus, being taken through the line 3—3, Figure 1.

Fig. 4 is a vertical cross-sectional view through the valve actuating mechanism, being taken through the line 4—4, Figure 3, and Fig. 5 is an enlarged cross-sectional view through one of the sleeves and sleeve valves controlling the flow of water in the tubes, being taken through the line 5—5, Figure 1.

Like characters of reference indicate corresponding parts in the different views in the drawings.

My apparatus broadly comprises a cylindrical shell 1 standing in an upright position, the bottom 2 of the shell being inclined towards an opening 3 which is flanged to be coupled to a back-wash water receiving drain. The upper portion of the shell is provided with a flanged water inlet opening 4 adapted to be coupled to a water feed pipe. The central portion of the shell is provided with a flanged water outlet opening 5 adapted to be coupled to a water outlet pipe. The top of the shell 1 is covered by a domed cap 6 removably secured thereto by a plurality of bolts 7 passing through the flanges 8.

The interior of the shell is divided into three chambers; an upper chamber 9, a central chamber 10 and a lower chamber 11. The chambers are formed by the provision of a pair of circular upper and lower partition plates 12 and 13. The lower partition plate 13 rests upon an annular shoulder 14 in the lower portion of the shell, and the upper partition plate 12 is supported upon a plurality of filter tubes 15 which extend between the partition plates. In the apparatus illustrated, five filter tubes are provided. The upper face of the partition plate 12 is formed with a concentric rib 16 containing a number of bolt holes 17. A gland packing ring 18 is positioned above the rib 16 and is of substantially the same outer diameter as the inner diameter of the shell 1. The ring is drawn towards the rib 16 by a plurality of screws or studs 19, freely passing through orifices 20 in the ring 18 and threaded into the orifices 17 in rib 16. A plastic packing 21 is provided underneath the ring 18 on top of the plate 12 so that a water-tight joint is made around the edge of the plate 12.

The partition plates 12 and 13 are each formed with five orifices 26 of substantially the same diameter as the bores of the tubes 15, and the tubes extend from an orifice in one plate to a corresponding orifice in the other plate. The portions of the plates surrounding the orifices are recessed to receive packings 122 between the ends of the tubes and the plates. To retain the plate and tube assembly tightly together, I furnish a plurality of stay bolts 22 extending between the plates to draw them together against the tube ends. The peripheral portion of the lower face of the partition plate 13 is recessed to receive a packing 23 which rests upon the shoulder 14 to make a water-tight joint. The lower ends of some of the bolts 22 are threaded through orifices in the shoulder 14 so that the tightening up of the bolts draws the partition plate 13 tightly against the shoulder. The upper face of the partition plate 12 supports five sleeves 24 formed with flanges 25 resting upon such upper face around the orifices 26, and are secured to the plate by a plurality of studs 27. The sleeves are of substantially the same inner diameter as the orifices 26 and the bores of the tubes, and are each formed in their upper portions with a number of fluid entrance ports 28. The tops of the sleeves are covered by plates 29 which support cylinders 30. The lower open ends of the cylinders 30 are formed with flanges 31 which are secured to the plates 29 by bolts 32.

The bottom face of the lower partition plate 13 supports five sleeves 33 of similar construction to the sleeves 24 and surrounding the lower orifices 28, the sleeves being secured to the plate by studs 34 and provided with fluid outlet ports 35 in their lower portions.

A sleeve valve 36 is furnished in each of the sleeves 24 and 33 and such valves are adapted to slide within the sleeves to cover and uncover the ports 28 or 35. The sleeve valves each consist of a ring 37 recessed in its outer face to contain a rubber facing 38 which has a watertight contact with the inner face of its sleeve. Each ring 38 is formed with a central spider 39 between the legs of which the water can freely flow, and formed with a central orifice 40 for the reception of a valve rod 41.

The pair of valves for each tube are supported upon a rod 41 and are so spaced apart upon such rod that when the upper valve is below the ports 28, the lower valve covers the ports 35 and when the rod 41 and the valves are raised, the upper valve covers the ports 28 and the lower valve moves above the ports 35. The upper ends of the rods 41 passing through the upper valves 38 are of reduced diameter and extend through gland packed openings 42 in the sleeve plates 29 and are secured to pistons 43 contained within the cylinders 30. The reciprocation of the pistons 43 in the cylinders 30 moves the rod and valve assemblies upwardly or downwardly as the case may be.

For moving the pistons 43 upwardly in the cylinders 30, any suitable fluid medium may be used, as for example the water pressure which is being fed through the filter, or oil pressure, or air if so desired. To feed the fluid medium to the cylinders, a plurality of pipe connections 44 pass through the upper portion of the shell 1 and are each connected to the lower end of a cylinder 30. To move the pistons downwardly, any suitable fluid medium may be used, as for example, compressed air, which is fed to the upper ends of the cylinders through a lead-in pipe 45 which is connected to the cylinder heads by branch pipes 46.

The operation of my apparatus is as follows:—

The water enters the upper chamber 9 through the inlet 4 and assuming that the upper valves 36 are in their lowermost positions in the sleeves 24 with the ports 28 uncovered, enters such ports and passes through the sleeve valves and through the orifices 26 in the plate 12 into the filter tubes 15 from where it passes through the walls of the tubes into the central chamber 10 and thence in a filtered condition to the outlet orifice 5; the ports 35 in the lower sleeves 33 being covered by the lower valves 36.

As the filtering process progresses, the impurities which have been taken out of the water by the filter tubes gradually reduce the porosity of the tubes and also build up on their inner faces. After a certain length of time it is necessary that the pores of the tubes be cleansed and the accumulation of foreign matter washed from their inner faces. To accomplish this without substantially interfering with the continuous filtering capacity of my apparatus, I provide the mechanism as before described, wherein I clean the tubes, preferably one at a time, without affecting the continuous filtering operation through the other tubes.

To clean one tube, as for example, the tube "A" in Figure 1, I inject any suitable fluid under pressure through the pipe 44 leading to its cylinder 30, the pressure fed through such pipe being greater than the pressure of compressed air fed through the pipe 45, so that the piston moves upwardly into the position shown in the filter tube assembly "A" in Figure 1. As the piston 43 and piston rod 41 move upwardly, the upper and lower valves also move upwardly until they reach the position illustrated, wherein the upper valve covers the water inlet ports 28 and the lower valve is above the lower ports 35 opening to the backwash drain. When this movement is accomplished, the passage of water from the chamber 9 into the filter tube "A" is cut off and the water in the bore of the filter tube "A" runs out of such tube through the lower sleeve valve 36 and through the ports 35 to the back-wash drain.

It is to be understood that as water is fed into my filtering apparatus under pressure, that there is a pressure differential between the pressure of water in the bores of the tubes and in the central chamber 10, and that the filtered water in such chamber 10 is under pressure somewhat less than the pressure in the tubes. Therefore, when the feed water pressure in the tube "A" is cut off, the filtered water in the chamber 10 will pass from the chamber back through the wall of the tube "A" and into its bore, thus in its reversal of flow through the wall, it washes the accumulated filtered matter from out of the pores of the tube and also washes off the accumulation of filtered matter on the inner wall of the tube in its return movement. The water which has returned through the wall of the tube with its accumulated filtered matter removed from the tube, passes downwardly through the tube bore and through the uncovered valve ports 35 into the back-wash drain chamber 11 and thence out of the apparatus through the outlet orifice 3.

To return the piston for the tube "A" to its original position, the fluid pressure through the pipe 44 is released, and the compressed air or other fluid which is fed to the upper end of the cylinder moves the piston downwardly and exhausts the lower side of the cylinder.

When one of the tubes has been backwashed, its valves are returned to their normal position, whereby the feed water again enters the bore of the tube and passes outwardly through its wall. The various tubes are backwashed cleaned in rotation at intervals depending upon the type of installation and size and capacity of the tubes. My tubes as illustrated are formed of a porous, molded and vitrified material which presents tortuous paths for the fluid through the tube walls, retaining all foreign matter. It is, of course, not necessary that my apparatus contain tubes of this particular material, as tubes formed of any filtering medium, such as wire mesh, may be used.

In Figs. 3 and 4, I illustrate a fluid feed mechanism which may be used for automatically back-washing the tubes in rotation. This mechanism broadly comprises a cup 46 having five circumferentially arranged orifices 48 which lead to its cylindrical interior 47. Each orifice 48 receives the end of a tube 44. In the interior 47 of the cup, I furnish a rotatable member 50 which is a fluid tight fit therein. This member is formed with a radial passage 51 which is connected to a fluid supply pipe 52. Upon rotation of the member 50, its radial passage 51 successively moves into communication with the orifices 48, whereby connection is successively established between the fluid supply pipe and the various cylinders.

In order to permit the fluid in one cylinder to exhaust when the piston is returned to its initial position, I form the member 50 with a peripheral groove 53 which registers with the orifices 48 and is connected to an exhaust passage 54. The fluid exhausted from a cylinder 30 through the downward movement of its piston, passes backwardly through the pipe 44, through its orifice 48 into the groove 53, and thence to the exhaust passage 54. The member 50 can be rotated in any suitable manner, as by a worm and gear drive 55.

From the foregoing description, it will be apparent that I have devised a simple and efficient filtering apparatus wherein the filtering tubes can be successively cleaned without interrupting the normal functioning of the filter, and although I have shown a particular assembly of my apparatus, it is to be understood that it is susceptible to alteration without departing from the spirit of my invention as set forth in the appended claims.

What I claim as my invention is:—

1. In a fluid filtering apparatus, a chamber through which fluid passes under pressure, a plurality of filtering tubes contained within the chamber and through the walls of which the fluid passes under a pressure differential between the bores of the tubes and the chamber, and a multiple-way valve mechanism for reversing the pressure differential between the bore of one tube and the chamber without disturbing the normal passage of fluid through the walls of the other tubes.

2. In a fluid filtering apparatus, a chamber through which fluid passes under pressure, a plurality of filtering tubes contained within the chamber and through the walls of which the fluid passes under a pressure differential into the chamber, and a two-way valve mechanism for each tube for reversing the pressure differential in relation to its tube so that the fluid passes from the chamber through the walls of the tube, each valve mechanism being operable without disturbing the normal passage of fluid through the walls of the other tubes into the chamber.

3. In a fluid filtering apparatus, a chamber through which fluid passes under pressure, a plurality of filtering tubes contained within the chamber and through the walls of which the fluid passes under a pressure differential into the chamber, a back-wash drain communicating with the bores of the tubes, valve assemblies controlling the communications between the tubes and the drain, and a two-way valve for reversing the passage of fluid through the wall of one of the tubes and operable in conjunction with the movement of a back-wash drain valve without disturbing the normal passage of fluid through the walls of the other tubes into the chamber.

4. In a fluid filtering apparatus, a chamber through which fluid passes under pressure, a plurality of filtering tubes contained within the chamber and in the bores of which the fluid is received and through the walls of which the fluid passes into the chamber, a back-wash drain communicating with the bores of the tubes, valves for controlling the entrance of fluid to the bores of the tubes, valves for controlling communication between the bores of the tubes and the back-wash drain, the fluid entry valves being normally open and the drain valves normally closed, a valve actuating connection between the entry valve and drain valve for each tube, and means for actuating said connection whereby one valve opens as the other valve shuts.

5. In a fluid filtering apparatus, a chamber through which fluid passes under pressure, a plurality of filtering tubes contained within the chamber and in the bores of which the fluid is received and through the walls of which the fluid passes into the chamber, a back-wash drain communicating with the bores of the tubes, valves for controlling the entrance of fluid to the bores of the tubes, valves for controlling communication between the bores of the tubes and the back-wash drain, the fluid entry valves being normally open and the drain valves normally closed, a valve operating rod connection between the entry valve and drain valve for each tube and contained within the bore of the tube, and means for actuating said rod whereby one valve opens as the other valve shuts.

6. In a fluid filtering apparatus, a chamber through which fluid passes under pressure, a plurality of filtering tubes contained within the chamber and in the bores of which the fluid is received and through the walls of which the fluid passes into the chamber, a back-wash drain communicating with the bores of the tubes, sleeves positioned at the tops and bottoms of the tubes and communicating with the bores thereof, said sleeves having fluid passage ports therein, sleeve valves contained in the upper sleeves for controlling the entrance of fluid to the bores of the tubes, sleeve valves contained in the lower sleeves for controlling communication between the bores of the tubes and the back-wash drain, the fluid entry valves being normally open and the drain valves normally closed, a valve actuating connection between the entry valve and drain valve for each tube, and means for actuating said connection whereby one valve opens as the other valve shuts.

7. In a fluid filtering apparatus, a chamber through which fluid passes under pressure, a plurality of filtering tubes contained within the chamber and in the bores of which the fluid is received and through the walls of which the fluid passes into the chamber, a back-wash drain communicating with the bores of the tubes, sleeves positioned at the tops and bottoms of the tubes and communicating with the bores thereof, said sleeves having fluid passage ports therein, sleeve valves contained in the upper sleeves for controlling the entrance of fluid to the bores of the tubes, sleeve valves contained in the lower sleeves for controlling communication between the bores of the tubes and the back-wash drain, the fluid entry valves being normally open and the drain valves normally closed, a valve operating rod extending between the entry valve and drain valve for each tube and positioned within the bore of the tube, and means for actuating said rod whereby one valve opens as the other valve shuts.

8. In a fluid filtering apparatus, a chamber through which fluid passes under pressure, a plurality of filtering tubes contained within the chamber and in the bores of which the fluid is received and through the walls of which the fluid passes into the chamber, a back-wash drain communicating with the bores of the tubes, sleeves positioned at the tops and bottoms of the tubes and communicating with the bores thereof, said sleeves having fluid passage ports therein, sleeve valves contained in the upper sleeves for controlling the entrance of fluid to the bores of the tubes, sleeve valves contained in the lower sleeves for controlling communication between the bores of the tubes and the back-wash drain, the fluid entry valves being normally open and the drain valves normally closed, a valve actuating connection between the entry valve and drain valve for each tube, piston and cylinder assemblies aligned with the sleeves and coupled to the valve actuating connections, and fluid pressure means communicating with the cylinders to actuate the pistons and valves.

9. In a fluid filtering apparatus, a chamber through which fluid passes under pressure, a plurality of filtering tubes contained within the chamber and in the bores of which the fluid is received and through the walls of which the fluid passes into the chamber, a back-wash drain communicating with the bores of the tubes, sleeves positioned at the tops and bottoms of the tubes and communicating with the bores thereof, said sleeves having fluid passage ports therein, sleeve valves contained in the upper sleeves for controlling the entrance of fluid to the bores of the tubes, sleeve valves contained in the lower sleeves for controlling communication between the bores of the tubes and the back-wash drain, the fluid entry valves being normally open and the drain valves normally closed, a valve operating rod extending between the entry valve and drain valve for each tube and positioned within the bore of the tube, piston and cylinder assemblies aligned with the sleeves and coupled to the valve operating rods, and fluid pressure means communicating with the cylinders to actuate the pistons and valves.

10. In a fluid filtering apparatus, a casing, a pair of horizontal transverse partitions dividing the casing into three chambers, a plurality of filtering tubes contained within the central chamber and extending from an orifice in one partition to an orifice in another partition, the fluid passing from the upper chamber through the walls of the filter tubes into the central chamber under pressure, a valve positioned below each tube for controlling the passage of fluid from the tube into the lower chamber, a valve positioned above each tube for controlling the passage of fluid from the upper chamber into the tube, the upper valve being normally open and the lower valve normally closed, and means for actuating the two valves of any tube to reverse their open and closed positions.

11. In a fluid filtering apparatus, a casing, a pair of horizontal transverse partitions dividing the casing into three chambers, a plurality of filtering tubes contained within the central chamber and extending from an orifice in one partition to an orifice in another partition, the fluid passing from the upper chamber through the walls of the filter tubes into the central chamber under pressure, sleeves positioned at the tops and bottoms of the tubes and communicating with the bores thereof, said sleeves having fluid passage ports therein, a sleeve valve contained within each upper sleeve for controlling the passage of fluid from the upper chamber into a tube, a sleeve valve contained within each lower sleeve for controlling the passage of fluid from a tube into the lower chamber, the upper valves being normally open and the lower valves normally closed, and means for actuating the two valves of any tube to reverse their open and closed positions.

12. In a fluid filtering apparatus, a casing, a pair of horizontal transverse partitions dividing the casing into three chambers, a plurality of filtering tubes contained within the central chamber and extending from an orifice in one partition to an orifice in another partition, the fluid passing from the upper chamber through the walls of the filter tubes into the central chamber under pressure, sleeves positioned at the tops and bottoms of the tubes and communicating with the bores thereof, said sleeves having fluid passage ports therein, a sleeve valve contained within each upper sleeve for controlling the passage of fluid from the upper chamber into a tube, a sleeve valve contained within each lower sleeve for controlling the passage of fluid from a tube into the lower chamber, the upper valves being normally open and the lower valves normally closed, a valve operating rod extending between the two valves of a tube and positioned within the bore of the tube, and means for actuating the rod whereby one valve opens as the other valve shuts.

13. In a fluid filtering apparatus, a casing, a pair of horizontal transverse partitions dividing the casing into three chambers, a plurality of filtering tubes contained within the central chamber and extending from an orifice in one partition to an orifice in another partition, the fluid passing from the upper chamber through the walls of the filter tubes into the central chamber under pressure, sleeves positioned at the tops and bottoms of the tubes and communicating with the bores thereof, said sleeves having fluid passage ports therein, a sleeve valve contained within each upper sleeve for controlling the passage of fluid from the upper chamber into a tube, a sleeve valve contained within each lower sleeve for controlling the passage of fluid from a tube into the lower chamber, the upper valves being normally open and the lower valves normally closed, a valve operating rod extending between the two valves of a tube and positioned within the bore of the tube, piston and cylinder assemblies aligned with the sleeves and coupled to the valve actuating rods, and fluid pressure means communicating with the cylinders to actuate the pistons and valves.

14. In a fluid filtering apparatus, a casing, a pair of horizontal transverse partitions dividing the casing into three chambers, a plurality of filtering tubes contained within the central chamber and extending from an orifice in one partition to an orifice in another partition, the fluid passing from the upper chamber through the walls of the filter tubes into the central chamber under pressure, sleeves positioned at the tops and bottoms of the tubes and communicating with the bores thereof, said sleeves having fluid passage ports therein, a sleeve valve contained within each upper sleeve for controlling the passage of fluid from the upper chamber into a tube, a sleeve valve contained within each lower sleeve for controlling the passage of fluid from a tube into the lower chamber, the upper valves being normally open and the lower valves normally closed, a valve operating rod extending between the two valves of a tube and positioned within the bore of the tube, a piston and cylinder assembly mounted upon the top of each upper sleeve, each piston being coupled to a valve actuating rod, and fluid pressure means communicating with the cylinders to actuate the pistons.

15. In a fluid filtering apparatus, a casing, a pair of horizontal transverse partitions dividing the casing into three chambers, a plurality of filtering tubes contained within the central chamber and extending from an orifice in one partition to an orifice in another partition, the fluid passing from the upper chamber through the walls of the filter tubes into the central chamber under pressure, sleeves positioned at the tops and bottoms of the tubes and communicating with the bores thereof, said sleeves having fluid passage ports therein, a sleeve valve slidable within each upper sleeve to cover and uncover its ports and having a fluid passageway there-through so that fluid entering the uncovered ports can pass through the valve, a sleeve valve slidable within each lower sleeve to cover and uncover its ports and also having a fluid passageway therethrough so that fluid can pass through the valve and through the ports when the ports are uncovered, and piston means for sliding the valves within the sleeves.

16. In a fluid filtering apparatus, a chamber through which fluid passes under pressure, a plurality of filtering tubes contained within the chamber and through the walls of which tubes the fluid passes under a pressure differential, a drain communicating with the bore of each tube, and a valve mechanism for each tube to control the communication between the bore of its tube and the drain and also control the pressure differential between the chamber and the bore of its tube.

17. In a fluid filtering apparatus, a casing, a pair of horizontal transverse partitions each having a plurality of orifices therein and dividing the casing into three chambers, the top chamber being provided for the reception of fluid and the bottom chamber as a back-wash drain, a plurality of filtering tubes contained within the central chamber, the bore of each tube communicating with an orifice through one partition and also communicating with an orifice through the other partition, the fluid passing through the walls of the tubes under a pressure differential, and a valve mechanism for each tube to control the communication between the bore of its tube and the back-wash drain and also control the pressure differential between the central chamber and the bore of its tube.

RENARD PAUL ADAMS.